Oct. 29, 1935.  C. SAUZEDDE  2,018,685
COMPRESSOR FOR FLUID ACTUATED BRAKES
Filed Aug. 27, 1932  2 Sheets-Sheet 2
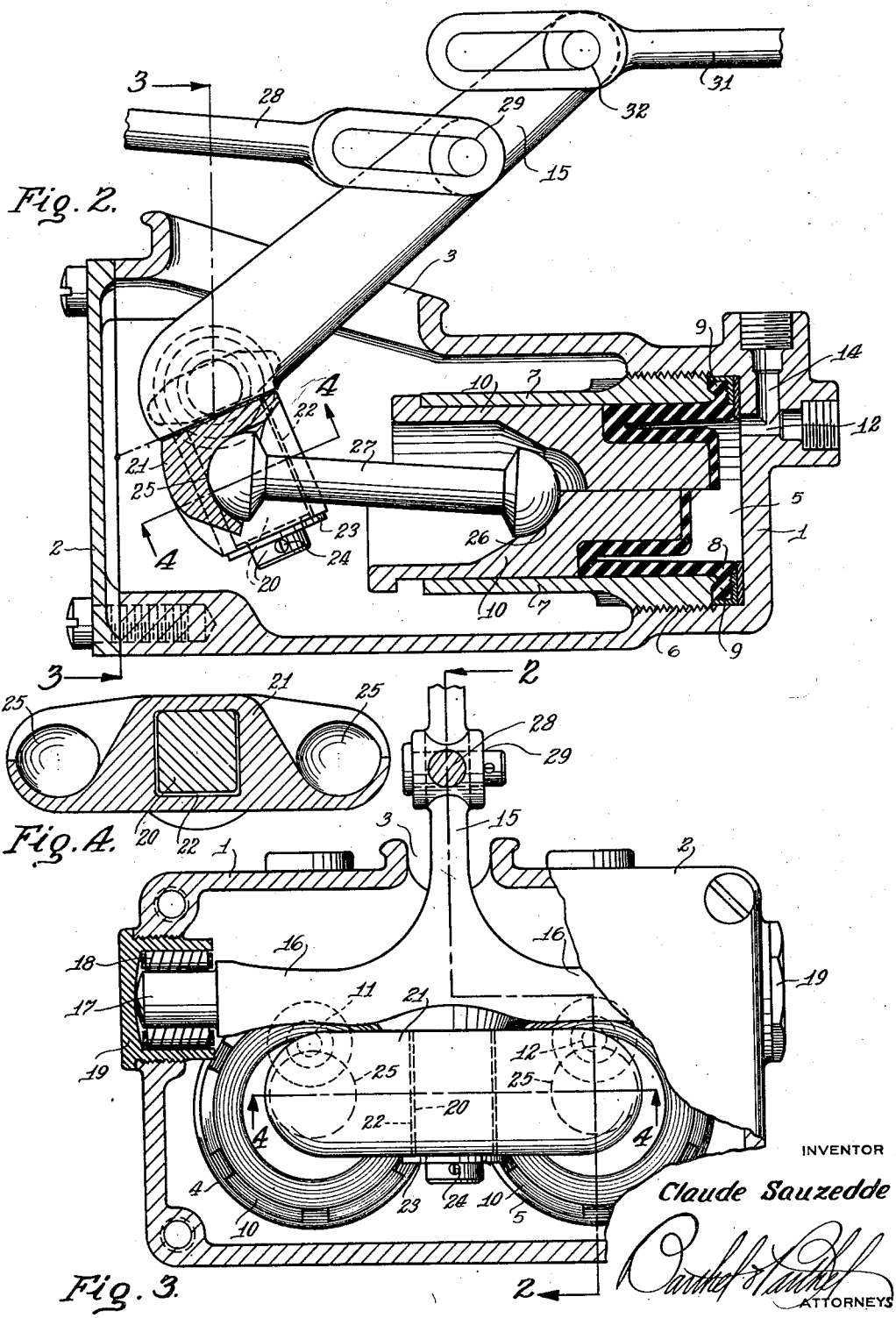
INVENTOR
Claude Sauzedde
ATTORNEYS Patented Oct. 29, 1935

2,018,685

UNITED STATES PATENT OFFICE 2,018,685

COMPRESSOR FOR FLUID ACTUATED BRAKES

Claude Sauzedde, Detroit, Mich., assignor to Detroit Hydrostatic Brake Corporation, Detroit, Mich., a corporation of Michigan Application August 27, 1932, Serial No. 630,724

5 Claims. (Cl. 60—54.6)

The present invention relates to a novel fluid actuator of a type adapted for actuation by foot and hand levers and particularly adapted for use on automobiles and like vehicles having brakes operated by fluid pressure.

Hydrostatic brake systems for this service generally utilize a liquid fluid as the agent for translating the movements of the foot-pedal to the brake mechanism located at the points of brake application, a suitable structure, as a piston and cylinder, being located at the pedal end of the line, the opposite end of the line leading to suitable mechanism rendered active by the pressure transmitted from the pedal through the mobile fluid, the latter thus taking on the characteristics of a fluid piston. In this service, the fluid is substantially incompressible, since the purpose is to utilize as far as possible the effective pressure applied at the pedal, without dissipating pressure in compression of the fluid itself. The general characteristics of this type of service have also been utilized where the brake mechanisms have been separated into two units—as, for instance, an individual service for the brakes of the front and rear wheels, two independent lines being utilized in place of the single line, thus providing the advantage of retaining brake service for one unit in case of damage to the line of the other unit. While the dual-line type has the advantage in this respect, it also carries the need for setting up the conditions of substantially equal pressure within the lines, if the brake application is to be equal at all points of service. To obtain this result the time of actuation of the fluid piston of each line should be simultaneous; actual equality in amount of fluid in each line is not essential to produce this result, since the length of the fluid piston becomes immaterial. The difficulty arises when, through slight leakage, temperature changes, etc., the normal relation between the two lines becomes varied, so that the simultaneous application of the pressure from the pedal on both lines is disturbed—under such conditions, the pressure on one line becomes active in advance of the other, with the result that there is a consequent difference in the brake application as between the units. Of course, where one of the lines is damaged so that it becomes inactive, the pressure then reaches to but the single line.

It is in this setting that the present invention is found, the purpose being to provide a normal condition in which the simultaneous application can take place, even in presence of small variations as between the lines, the equalization condition being quickly set up to provide the balanced relation as between the lines. And, further, to provide a definite and positive relation between the pedal and the active line in case of failure of the other line, so as to permit the active unit to function properly and efficiently to meet the emergency.

With the above and other ends in view the invention consists in matters hereinafter set forth and more particularly pointed out in the appended claims, reference being had to the accompanying drawings, in which Figure 1 is a side elevation of the present actuator illustrating a foot pedal connected thereto and the rod which is adapted for connection to a hand lever;

Fig. 2 is a cross section taken on the line 2—2 of Fig. 3;

Fig. 3 is a cross section taken on the line 3—3 of Fig. 2, and

Fig. 4 is a cross section taken on line 4—4 of Figs. 2 and 3.

Like characters of reference are employed throughout to designate corresponding parts.

Figure 1:
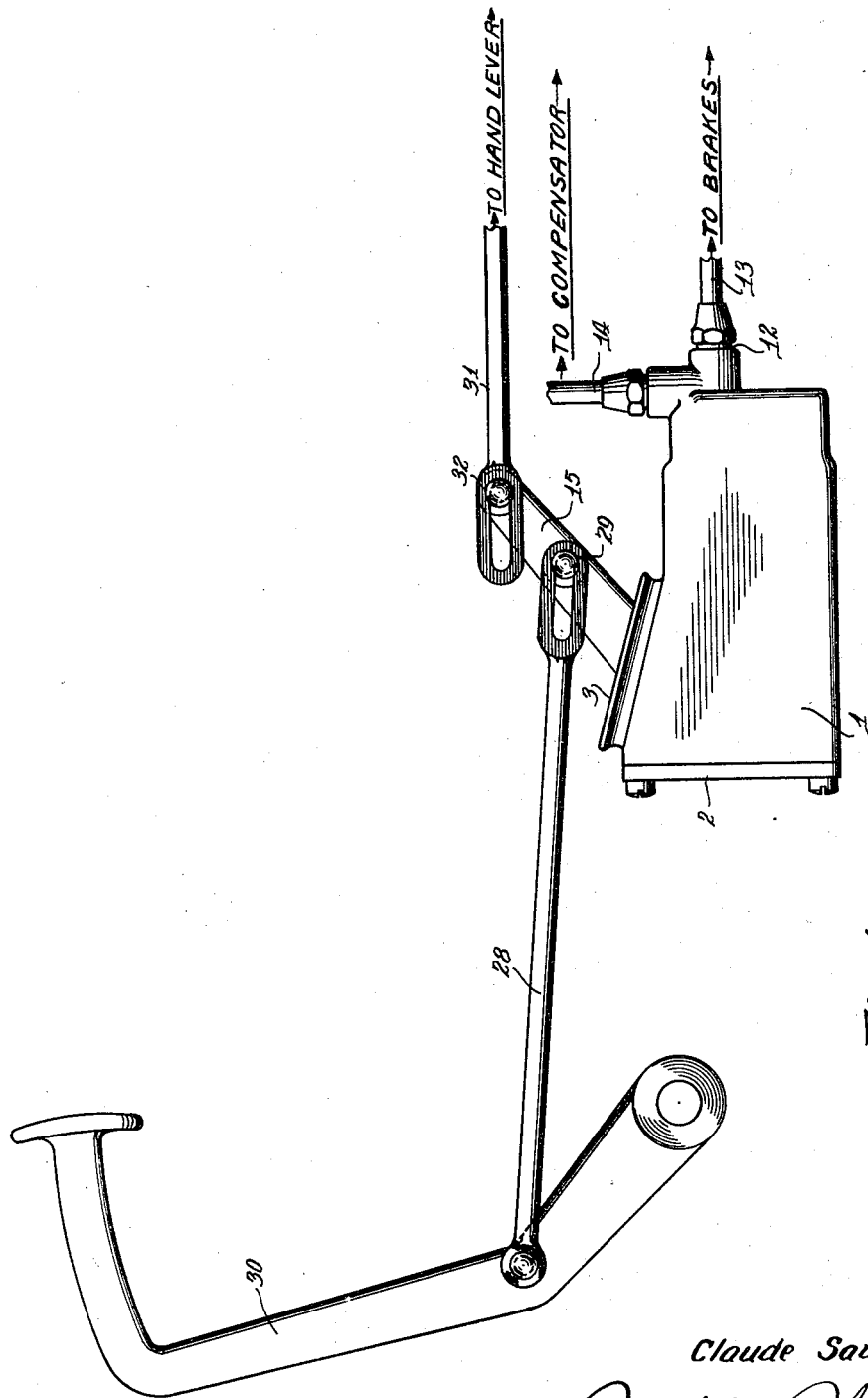

The present fluid actuator is formed in a casing 1 which is adapted to be mounted on an automobile or like vehicle. The front end of the casing is closed with a removable cover plate 2, the same being removable so that the mechanism which is enclosed in said casing may be readily installed or removed for repairs or replacements. In the top of the casing is formed a slot 3.

In the rear end of the casing 1 a pair of parallel chambers 4 and 5 are formed, each chamber having a screw threaded portion 6 which receives the end of a sleeve 7. A double cup flexible seal 8 is formed with an outwardly extending flange 9 which becomes tightly interposed between the bottom of the chamber and the sleeve 7 and thus provides a closed chamber with no possibility of fluid escaping past the sleeve 7. A stepped head piston 10 is slidably received in the sleeve 7, the stepped head projecting into the double cup flexible seal.

The chambers 4 and 5 are provided with outlets 11 and 12 respectively, the outlet 11 being adapted to be connected through a suitable line to the front wheel brakes and the outlet 12 being connected by a line 13 to the brakes on the rear wheels of a vehicle. As illustrated in Fig. 2 a port 14 may be provided through which connection may be made to a compensatory device through means of which a fluid may be supplied to the chamber 5, line 13, and a braking system connected to the latter. It is to be understood that the port 14 is duplicated on the port 11 leading from the chamber 4.

An operating lever 15 extends through the slot 3 and is provided with integral transversely extending arms 16 whose outer ends 17 are received in bearings 18 that are supported in the removable members 19 that are screwthreaded into the side walls of the casing 1. In this manner the operating lever 15 is pivotally supported in the casing 1.

Projecting downwardly from the lever 15 at a point lower than its axis of pivotal movement is a square or otherwise angular stud 20. A cross arm 21 is provided with an opening 22 permitting the same to be mounted on the angular stud 20, the opening 22 being of a shape corresponding to the shape of the stud but sized to provide a clearance between the stud and opening in a manner to permit a limited rotary movement of the cross arm relative to the stud. The cross arm 21 is retained on the stud 20 by a washer 23 that is held in place by a screw 24.

Adjacent the outer ends of the cross arm 21 and in line with the axis of the pistons 10 are formed semi-spherical depressions 25. In the pistons 10 are formed semi-spherical depressions 26 which are concentric with the axis of the pistons 10. Rods 27 having semi-spherical heads on each end thereof are inserted between each end of the cross arm and the piston 10 adjacent thereto, the semi-spherical heads being received in the semi-spherical depressions in a manner to maintain the rods in their proper positions without the necessity of positive connections.

By this particular arrangement it will be seen that the cross-arm 21 is located close to the axis of pivotal movement of the operating lever, through its mounting on the stud 20, with the cross arm held from any material movement longitudinally of the stud. Hence, the cross-arm is forced to partake of all of the pivotal movements of the stud. And since the position of the latter locates the cross-arm close to the axis of the lever, it can be understood that the entire operating unit can be of comparatively small dimensions due to the fact that the short lever arm of the bell-crank—the stud and cross-arm—is very short, so that the long lever arm is not required to have excessive length in order to secure the desired leverage. This is of great advantage due to the fact that the arrangement of the pistons and cylinders is such that the entire structure can be located within a comparatively small casing. Fig. 1, for instance, offering a basis of comparison with the usual pedal structure 30.

As is understood, therefore, the cross-arm and stud are so formed that the cross-arm will partake of the pivotal movements of the lever, through the stud arrangement, and yet provide, through the lost-motion characteristic of the connection between stud and cross-arm, for a limited relative movement between stud and cross-arm transversely of the lever axis of pivotal movement, thus permitting of a limited freedom of action of the two fluid systems to compensate for small variations between the systems, but which will not render the structure inactive in the event of the failure of one of the systems.

A drag link 28 is attached to the operating lever 15 by a slidable slot and pin connection 29, the forward end of the drag link being connected to a foot pedal 30 such as is ordinarily used on automobiles and like vehicles for the application of service brakes. A link 31 is attached to the operating lever by a slidable slot and pin connection 32 and this link is adapted to be connected to a hand lever such as is ordinarily used on automobiles and like vehicles for the application of parking or emergency brakes.

Since the return of the applied brake mechanisms to inactive position is generally through spring pressure made active at suitable points, it can be understood that when the lever 15 is released from the applying pressure, such spring action will tend to shift the fluid pistons toward the chambers 4 and 5, thus moving the respective pistons rearwardly, with the result that the relation of the stud 20 with the walls of the opening 22 are substantially as in Fig. 4, with the stud in contact with the front wall of the opening. Assuming that the proper relation between the lines is present, rocking of lever 15 counter-clockwise in Fig. 2 will cause the stud to advance the cross-arm 21, and since the resistance of the lines is encountered concurrently in both chambers, the continued advance of the cross-arm will cause the fluid to be discharged from the chambers into the lines, thus causing movement of the fluid pistons, the pressure set up by the latter at the brake mechanism ends of the line, serving to apply the brakes.

Should the relation between the lines be disturbed, so that resistance to the advance of both ends of the cross-arm is not encountered at the same instant, the succeeding advance of the arm is changed somewhat in characteristic as will be understood from the following:

Assuming that, in some way, there has been a relative loss of fluid content in one line relative to the other, or wear of brake structures in the two units has been uneven so as to set up a change in conditions from that of the normal or designed condition, it can be understood that when the stud and cross-arm are advanced, the resistance to advance of one line will be encountered before that of the other line. Under such conditions the end encountering the resistance cannot advance with the freedom of the opposite end of the cross-arm, due to the lost-motion condition set up between the stud and the walls of opening 22, the result being that the unopposed end will advance under the stud action while the opposed end remains stationary. The advance of the unopposed end, however, is at a more rapid rate than the relative retrograde movement of the opposed end, due to the fact that at the instant when the disturbed condition beween the lines is detected by the cross-arm with the resultant tendency of the latter to rock on the stud, the fulcrum by which the pressure is being applied from the stud to the cross-arm is shifted from its position across the face of the stud to a position at the end of such face adjacent the opposed end of the cross-arm. Consequently, the leverage relation between the ends of the arm is changed with the shorter end active as the power end due to the presence of the resistance; hence, the longer arm or lever which is to act on the unopposing line, will advance more rapidly, and thus bring such end into its opposed relation more quickly and with less retrograde movement of the shorter lever.

When both levers encounter the resistance, the cross-arm becomes active as a drive for both lines, but with unequal resistance effect, due to the fact that the resistance of one line is being applied with greater leverage than the other, with the result that there is a momentary automatic adjustment of the angularity of the cross-arm until a balanced condition is set up through the leverage relationships, after which the continued movement of lever 15 applies the equal pressure to both lines.

The freedom of adjustment in this respect is limited to the relation between the stud and the walls of opening 22, but it is sufficient to meet the usual service conditions. This is true especially in the system of which the present invention forms a part, and in which a compensatory mechanism (disclosed in companion applications Serial No. 563,327—filed Sept. 17, 1931—and Serial No. 604,504—filed April 11, 1932, the latter having matured into Patent No. 2,001,749) is employed, and in which the openings 14 represent the channels of communication between such mechanism and the respective lines. In service, the lines are balanced at frequent intervals, so that the lost motion relation between the stud and walls of the opening is sufficient to meet the usual service conditions.

However, where one of the lines is damaged or encounters such a loss of content that the unopposed advance of the longer arm is not ended before the lost-motion limit is reached, the advance of the stud continues with the pressure applied only through the shorter lever arm. Should the line loss be insufficient to prevent encountering of the resistance by the longer lever arm prior to the completion of the advancing stroke, and before the active brake mechanism has itself developed a resistance sufficiently greater than that encountered by the longer lever end, there may be a possibility of a momentary balancing condition, but generally, where the active brake mechanism has reached a point where the opposed resistance active through the longer arm is insufficient to overcome the resistance of the active brake mechanism, the relationship established by the lost motion limit will be retained, and the second line become active to a limited extent only, if active at all; as stated, the use of the compensatory device, would normally prevent these conditions, and where that is insufficient, it is evident that the loss is due to some causes sufficient to make the line practically inactive.

The advantage in this respect lies in the fact that when one of the lines becomes inactive in this manner, the possibility of brake action is not lost, although it becomes confined to one of the units. When this occurs, however, the movement of the cross-arm to its lost-motion limit has placed the active lever arm as of the shortest character, thus, in effect, bringing the drive relationship between lever 15 and the connection 27 closer together to ensure greater effectiveness in the application of the pressure on the active brake mechanisms.

Hence, the arrangement sets up the conditions of an instantaneous detector of disturbing variations as between the lines, a development of remedial action rapidly through the long and short leverage, a limiting of the leeway in this respect through the lost motion limit, and, finally, the continued activity with an improved power application through the shorter leverage arm. Actually, however, these features are serviceable in other respects, since material disturbing conditions are made aware to the operator, without complete loss of braking power, enabling him to set up his compensatory activity without delay, thus serving as a warning activity not only in this respect but in the event of the serious condition of complete loss of action of one line.

Although a specific embodiment of the present invention has been illustrated and described, it is to be understood that various changes may be made in the details of construction without departing from the spirit of the invention as set forth in the appended claims, and such changes are contemplated.

What I claim is:—

1. A fluid actuator comprising a pair of chambers adapted to be separately connected to independent brake systems, pistons slidably mounted in said chambers, a pivoted operating lever, a downwardly projecting angular stud on said lever, said lever and stud presenting characteristics of leverage of the first order with the pivot of the lever presenting the fulcrum point, a cross arm mounted on said stud and movable with the stud in the leverage movements, said arm and stud being relatively formed to present a limited lost-motion relation operative in directions substantially transverse to the direction of pivotal movement of the leverage, and rods interposed between said cross arm and said pistons.

2. A fluid actuator comprising a pair of chambers adapted to be separately connected to independent brake systems, pistons slidably mounted in said chambers, a pivoted operating lever, a downwardly projecting angular stud on said lever, a cross arm having an angular opening corresponding to the shape of said stud and of greater size thereof, said cross-arm being secured on the stud to cause the arm to partake of the stud movements, said stud and arm opening permitting a limited lost-motion relation between stud and arm in directions substantially tranverse to the direction of pivot movement of the stud, and rods interposed between the ends of said cross arm and said pistons.

3. A fluid actuator for hydrostatic brakes comprising a casing having a slot in the upper wall thereof, an operating lever pivotally mounted in the side walls of said casing and extending through said slot, chambers formed in said casing and adapted to be connected to independent brake systems, pistons slidably mounted in said chambers, an angular stud formed on said operating lever and extending angularly to the pivot axis and in proximity to said axis, said lever and stud presenting characteristics of leverage of the first order, with the pivot of the lever presenting the fulcrum point of the leverage, a cross-arm mounted on said angular stud and capable of limited floating movement thereon in directions at substantially right angles to said pivot axis, and rods interposed between the outer ends of said cross arm and said piston.

4. In actuators for hydrostatic braking systems, wherein the brake mechanisms are respectively located as structures in operative relationship to either of two individual service lines, said service lines and their fluid content, and an actuator common to the service lines, said actuator including a cylinder and piston individual to each line, an operating element movable on a fixed pivotal axis and presenting characteristics of leverage of the first order with the pivotal axis presenting the fulcrum point, a cross-arm carried by and movable with said element, and connections between the opposite end zones of said arm and the respective pistons, the mounting of the cross-arm on such element providing a limited lost-motion relation therebetween at a point in the length of the cross-arm such as to produce the conditions of an equal or unequal leverage relationship between the arm and the respective piston connections dependent on the relationship of the service lines to each other as to the beginning of resistance activity to the advance of the cross-arm, said mounting including an angular stud and a complemental opening for the stud with the opening of larger cross-sectional dimensions than the stud, the stud axis extending substantially normal to the pivotal axis of the element.

5. An actuator as in claim 4 characterized in that the stud is carried by the element and is angular in cross-section, the cross-arm having the opening to complete the mounting, the opening being complemental in cross-section to the stud and of larger cross-sectional area than the similar area of the stud.

CLAUDE SAUZEDDE.